US012705802B2

(12) United States Patent
Meilland et al.

(10) Patent No.: US 12,705,802 B2
(45) Date of Patent: Aug. 11, 2026

(54) PERSPECTIVE CORRECTION WITH DEPTH CLAMPING

(71) Applicant: Apple Inc., Cupertino, CA (US)

(72) Inventors: Maxime Meilland, San Jose, CA (US); Duncan A. McRoberts, Boulder, CO (US); Julien Monat Rodier, San Francisco, CA (US); Seyedkoosha Mirhosseini, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 18/612,967

(22) Filed: Mar. 21, 2024

(65) Prior Publication Data

US 2024/0233205 A1 Jul. 11, 2024

Related U.S. Application Data

(63) Continuation of application No. PCT/US2022/042752, filed on Sep. 7, 2022.

(Continued)

(51) Int. Cl.

| | |
|---|---|
| ***G06T 11/00*** | (2026.01) |
| ***G06T 3/00*** | (2024.01) |
| ***G06T 7/50*** | (2017.01) |

(52) U.S. Cl.

CPC ................ *G06T 11/00* (2013.01); *G06T 3/00* (2013.01); *G06T 7/50* (2017.01)

(58) Field of Classification Search

CPC .. G06T 11/00; G06T 3/00; G06T 7/50; H04N 13/128; H04N 13/117

(Continued)

(56) References Cited

U.S. PATENT DOCUMENTS

| | | | | |
|---|---|---|---|---|
| 9,042,667 | B2 * | 5/2015 | Venkataraman | G06T 7/50 382/233 |
| 10,437,342 | B2 * | 10/2019 | Brunner | G06T 7/50 |

(Continued)

OTHER PUBLICATIONS

Lasang, Pongsak, et al. "Optimal depth recovery using image guided TGV with depth confidence for high-quality view synthesis." Journal of Visual Communication and Image Representation 39 (2016): 24-39. (Abstract).

(Continued)

*Primary Examiner* — Sheree N Brown
(74) *Attorney, Agent, or Firm* — Fernando & Partners, LLP

(57) ABSTRACT

In one implementation, a method of performing perspective correction of an image is performed by a device including an image sensor, a display, one or more processors, and non-transitory memory. The method includes capturing, using the image sensor, an image of a physical environment. The method includes obtaining a plurality of depths respectively associated with a plurality of pixels of the image of the physical environment. The method includes generating a clamped depth map of the image of the physical environment based on the plurality of depths, wherein each element of the clamped depth map has a depth value above or equal to a depth threshold. The method includes generating a display image by transforming, using the one or more processors, the image of the physical environment based on the clamped depth map and a difference between a perspective of the image sensor and a perspective of a user. The method includes displaying, on the display, the display image.

18 Claims, 10 Drawing Sheets

Related U.S. Application Data

(60) Provisional application No. 63/246,640, filed on Sep. 21, 2021.

(58) Field of Classification Search
USPC .......................................................... 345/619
See application file for complete search history.

(56) References Cited

U.S. PATENT DOCUMENTS

| | | | | |
|---|---|---|---|---|
| 10,455,219 | B2 * | 10/2019 | Cohen | H04N 13/122 |
| 10,623,723 | B2 * | 4/2020 | Ratcliff | H04N 13/351 |
| 10,652,514 | B2 * | 5/2020 | Briggs | G06T 15/04 |
| 11,483,543 | B2 * | 10/2022 | Ratcliff | H04N 13/117 |
| 11,516,452 | B2 * | 11/2022 | Edmonds | H04N 13/279 |
| 2018/0091800 | A1 * | 3/2018 | Ratcliff | H04N 13/305 |
| 2018/0157328 | A1 * | 6/2018 | Brunner | G06T 7/50 |
| 2020/0304776 | A1 * | 9/2020 | Ratcliff | H04N 13/366 |
| 2021/0019949 | A1 | 1/2021 | Ulbricht et al. | |

OTHER PUBLICATIONS

PCT International Search Report and Written Opinion dated Dec. 13, 2023, PCT International Application No. PCT/US2022/042752, pp. 1-21.

Office Action for corresponding Indian Appl. No. 202417019261 dated Feb. 24, 2026, 9 pages.

Office Action for corresponding European Appl. No. 22787037.5 dated Apr. 14, 2026, 8 pages.

Lai et al., "View interpolation for video see-through head-mounted display" User Interface Software and Technology ACM, Jul. 24, 2016, 2 pages.

* cited by examiner

PERSPECTIVE CORRECTION WITH DEPTH CLAMPING

CROSS-REFERENCE TO RELATED APPLICATIONS

This application is a continuation of Intl. Patent App. No. PCT/US2022/042752, filed on Sep. 7, 2022, which claims priority to U.S. Provisional Patent App. No. 63/246,640, filed on Sep. 21, 2021, which are both hereby incorporated by reference in their entirety.

TECHNICAL FIELD

The present disclosure generally relates to systems, methods, and devices for correcting a difference between a perspective of an image sensor and a perspective of a user in a physical environment.

BACKGROUND

In various implementations, an extended reality (XR) environment is presented by a head-mounted device (HMD). Various HMDs include a scene camera that captures an image of the physical environment in which the user is present (e.g., a scene) and a display that displays the image to the user. In some instances, this image or portions thereof can be combined with one or more virtual objects to present the user with an XR experience. In other instances, the HMD can operate in a pass-through mode in which the image or portions thereof are presented to the user without the addition of virtual objects. Ideally, the image of the physical environment presented to the user is substantially similar to what the user would see if the HMD were not present. However, due to the different positions of the eyes, the display, and the camera in space, this may not occur, resulting in impaired distance perception, disorientation, and poor hand-eye coordination.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
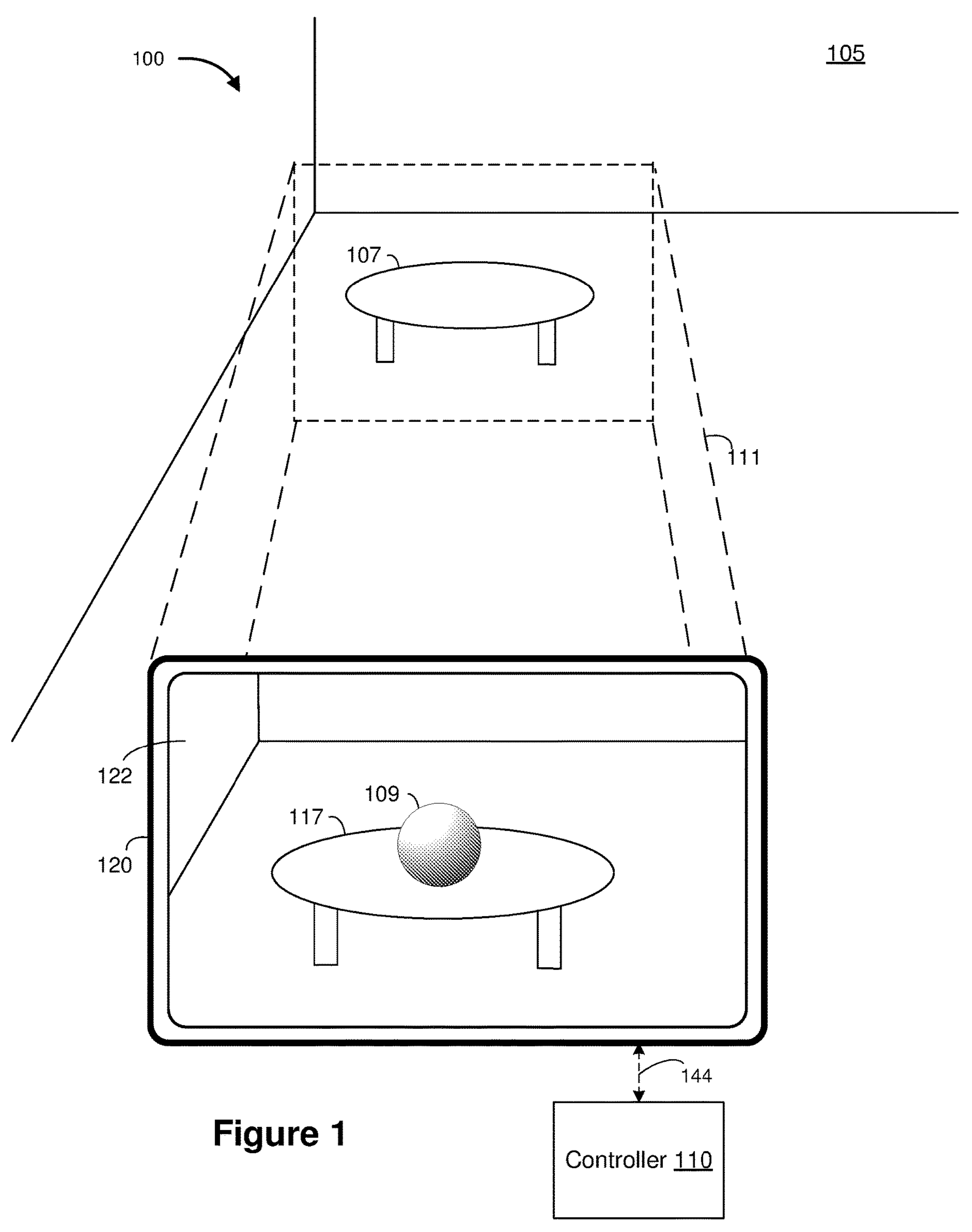
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performing perspective correction of an image. In various implementations, the method is performed by a device including an image sensor, a display, one or more processors, and non-transitory memory. The method includes capturing, using the image sensor, an image of a physical environment. The method includes obtaining a plurality of depths respectively associated with a plurality of pixels of the image of the physical environment. The method includes generating a clamped depth map of the image of the physical environment based on the plurality of depths, wherein each element of the clamped depth map has a depth value above or equal to a depth threshold. The method includes generating a display image by transforming, using the one or more processors, the image of the physical environment based on the clamped depth map and a difference between a perspective of the image sensor and a perspective of a user. The method includes displaying, on the display, the display image.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, in an HMD with a display and a scene camera, the image of the real world presented to the user on the display may not always reflect what the user would see if the HMD were not present due to the different positions of the eyes, the display, and the camera in space. In various circumstances, this results in poor distance perception, disorientation of the user, and poor hand-eye coordination, e.g., while interacting with the physical environment.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR sphere 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
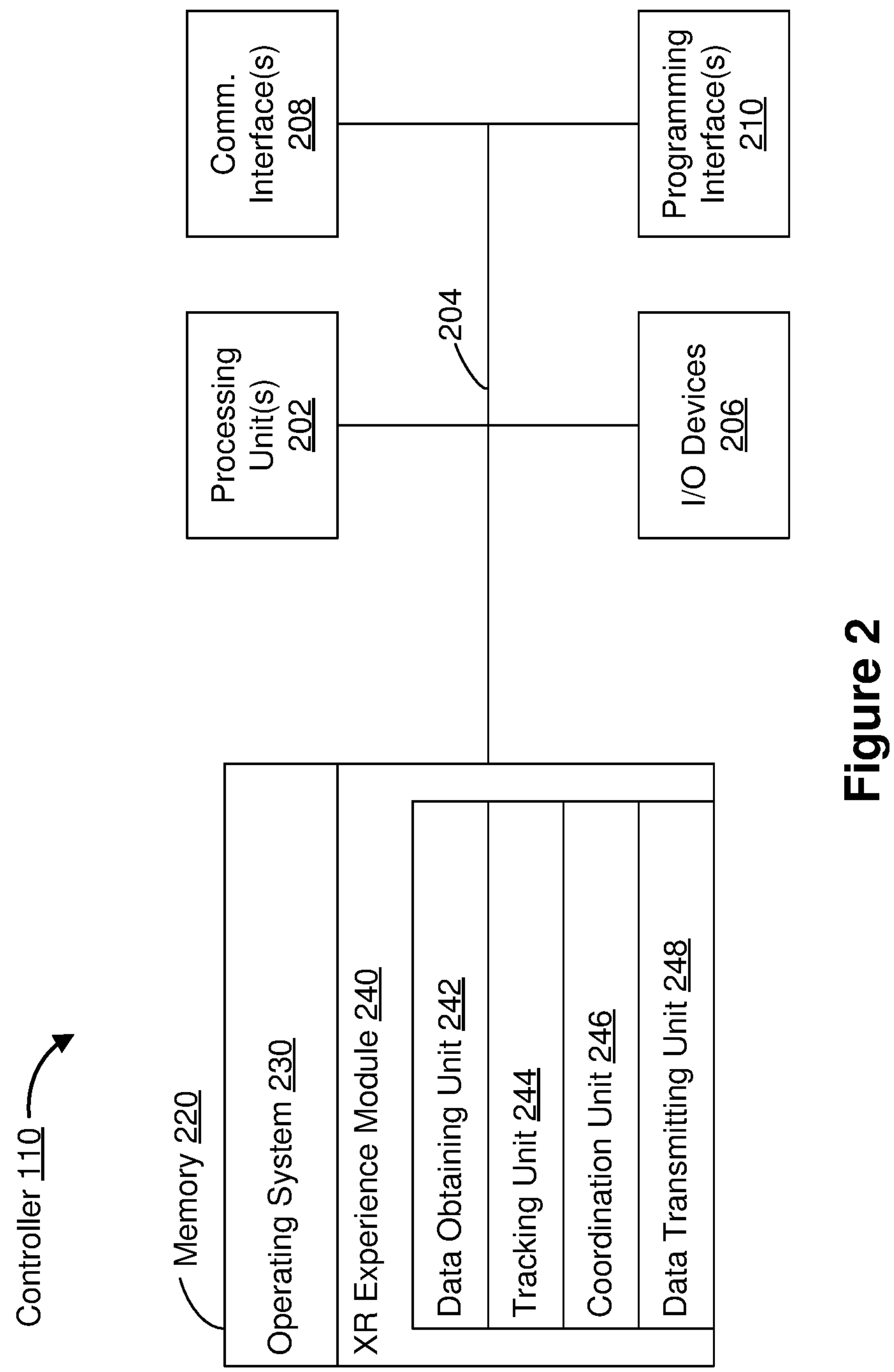
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
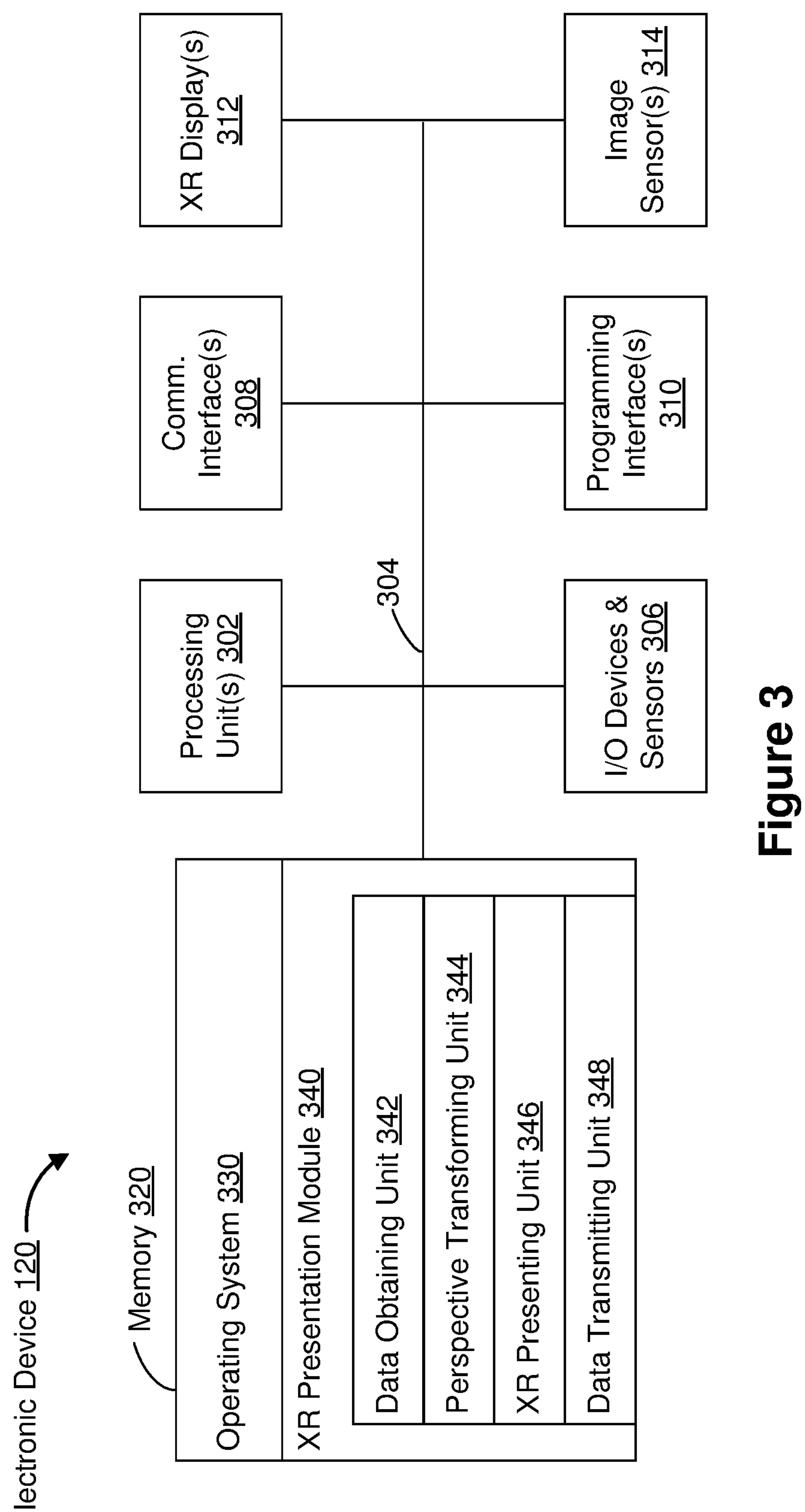
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the physical environment as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a perspective transforming unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the perspective transforming unit 344 is configured to transform an image (e.g., from one or more image sensors 314) from a first perspective to a second perspective. To that end, in various implementations, the perspective transforming unit 344 includes instructions and/or logic therefor, and heuristics and metadata therefor.

In some implementations, the XR presenting unit 346 is configured to display the transformed image via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the perspective transforming unit 344, the XR presenting unit 346, and the data transmitting unit 348 are shown as residing on a single device (e.g., the electronic device 120), it should be understood that in other implementations, any combination of the data obtaining unit 342, the perspective transforming unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
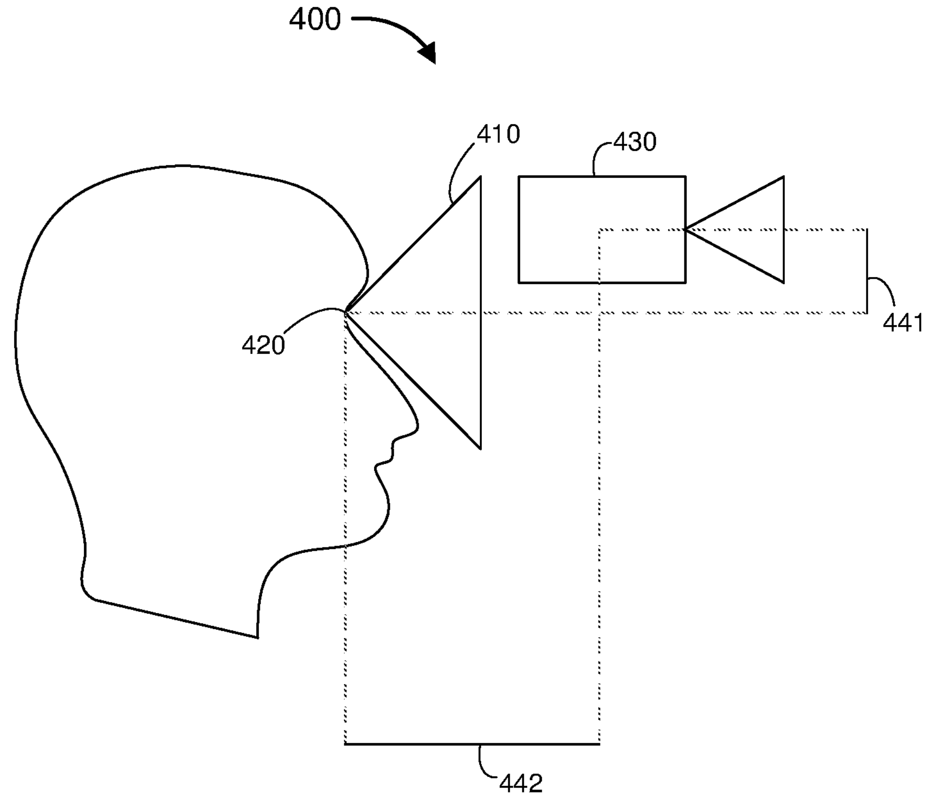
FIG. 4 illustrates an example scenario related to capturing an image of physical environment and displaying the captured image in accordance with some implementations.

FIG. 4 illustrates an example scenario 400 related to capturing an image of an environment and displaying the captured image in accordance with some implementations. A user wears a device (e.g., the electronic device 120 of FIG. 3) including a display 410 and an image sensor 430. The image sensor 430 captures an image of a physical environment and the display 410 displays the image of the physical environment to the eyes 420 of the user. The image sensor 430 has a perspective that is offset vertically from the perspective of the user (e.g., where the eyes 420 of the user are located) by a vertical offset 441. Further, the perspective of the image sensor 430 is offset longitudinally from the perspective of the user by a longitudinal offset 442. Further, in various implementations, the perspective of the image sensor 430 is offset laterally from the perspective of the user by a lateral offset (e.g., into or out of the page in FIG. 4).

Figure 5:
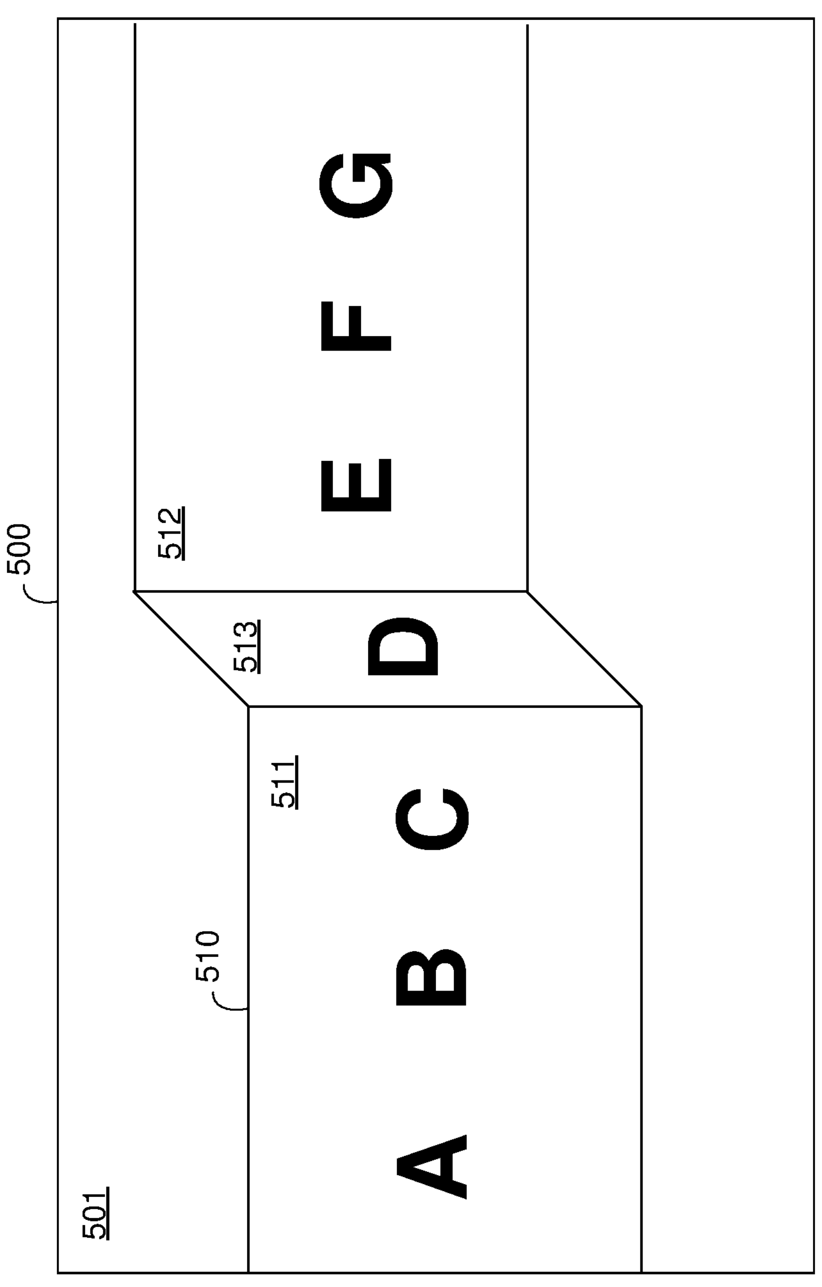
FIG. 5 is an image of physical environment captured by an image sensor from a particular perspective.

FIG. 5 is an image 500 of a physical environment 501 captured by an image sensor from a particular perspective. The physical environment 501 includes a structure 510 having a first surface 511 nearer to the image sensor, a second surface 512 further from the image sensor, and a third surface 513 connecting the first surface 511 and the second surface 512. The first surface 511 has the letters A, B, and C painted thereon, the third surface 513 has the letter D painted thereon, and the second surface 512 has the letters E, F, and G painted thereon.

From the particular perspective, the image 500 includes all of the letters painted on the structure 510. However, from other perspectives, as described below, a captured image may not include all the letters painted on the structure 510.

Figure 6:
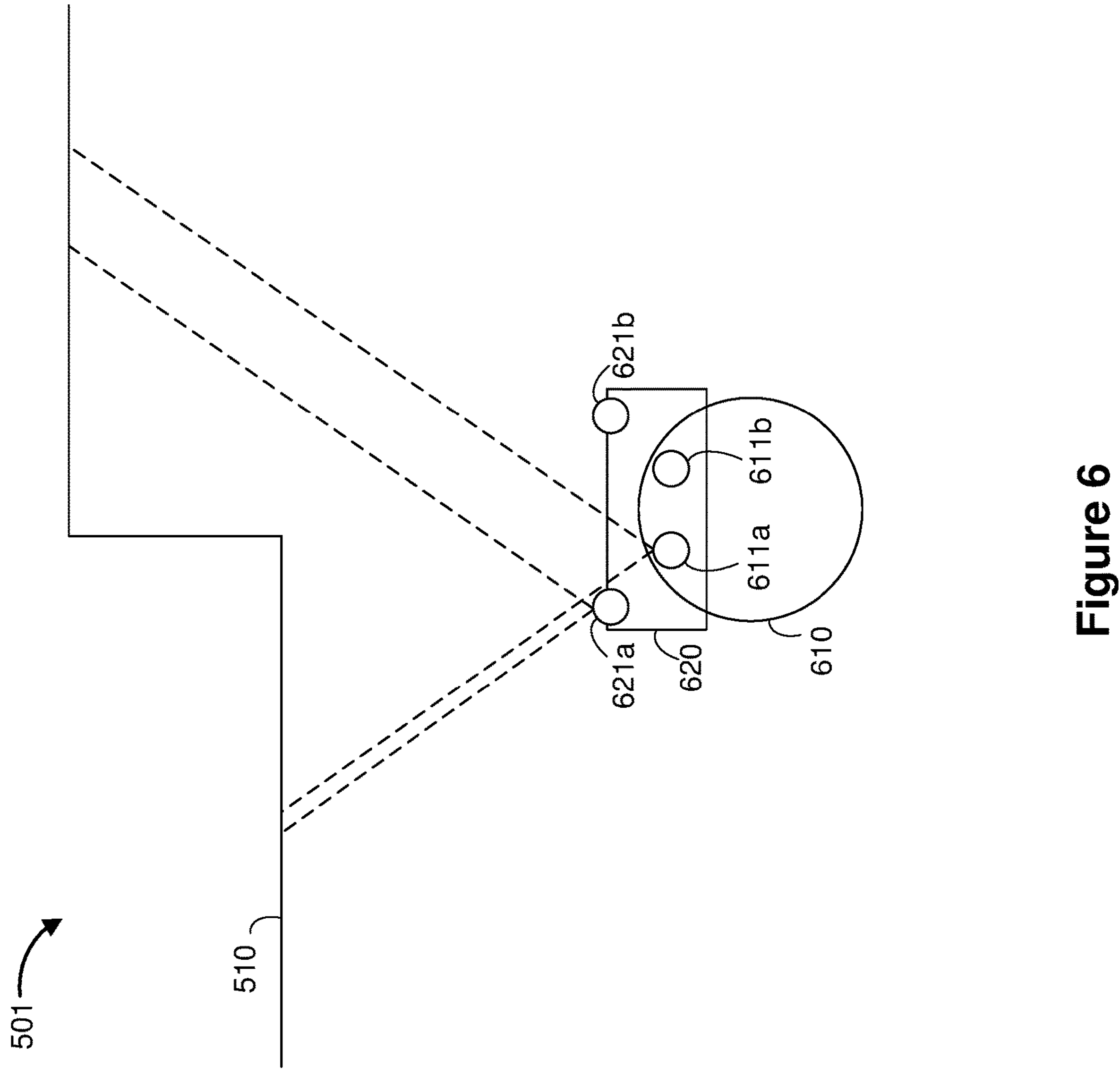
FIG. 6 is an overhead perspective view of the physical environment of FIG. 5.

FIG. 6 is an overhead perspective view of the physical environment 501 of FIG. 5. The physical environment 501 includes the structure 510 and a user 610 wearing an HMD 620. The user 610 has a left eye 611*a* at a left eye location providing a left eye perspective. The user 610 has a right eye 611*b* at a right eye location providing a right eye perspective. The HMD 620 includes a left image sensor 621*a* at a left image sensor location providing a left image sensor perspective. The HMD 620 includes a right image sensor 621*b* at a right image sensor location providing a right image sensor perspective. Because the left eye 611*a* of the user 610 and the left image sensor 621*a* of the HMD 620 are at different locations, they each provide different perspectives of the physical environment.

Figure 7A:
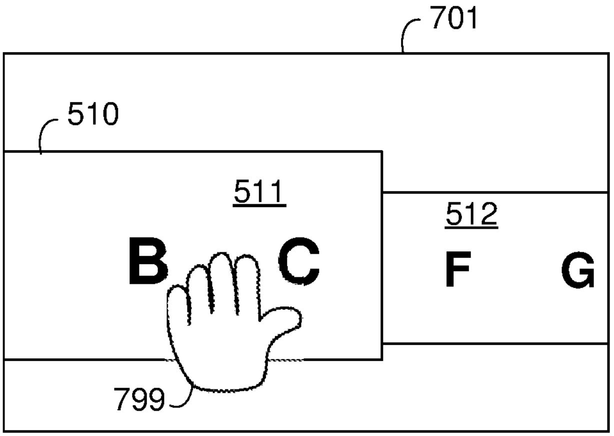
FIG. 7A illustrates a first image of the physical environment of FIG. 5 captured by a left image sensor.

FIG. 7A illustrates a first image 701 of the physical environment 501 captured by the left image sensor 621*a*. In the first image 701, the first surface 511 of the structure 510 and the second surface 512 of the structure 510 are present. The third surface 513 of the structure cannot be seen in the first image 701. On the first surface 511, the letters B and C can be seen, whereas the letter A is not in the field-of-view of the left image sensor 621*a*. Similarly, on the second surface 512, the letters F and G can be seen, whereas the letter E is not in the field-of-view of the left image sensor 621*a*. The first image 701 further includes a left hand 799 of the user in front of the first surface 511 approximately midway between the letters B and C and occluding neither.

Figure 7B:
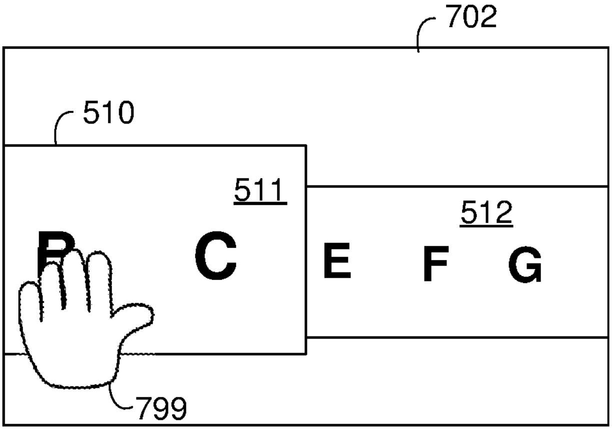
FIG. 7B illustrates a view of the physical environment of FIG. 5 as would be seen by a left eye of a user if the user were not wearing an HMD.

FIG. 7B illustrates a view 702 of the physical environment 501 as would be seen by the left eye 611*a* of the user 610 if the user 610 were not wearing the HMD 620. In the view 702, like the first image 701, the first surface 511 and the second surface 512 are present, but the third surface 513 is not. On the first surface 511, the letters B and C can be at least partially seen, whereas the letter A is not in the field-of-view of the left eye 611*a*. Similarly, on the second surface 512, the letters E, F, and G can be seen. Notably, in the view 702, as compared to the first image 701, the letter E is present on the second surface 512. Thus, the letter E is in the field-of-view of the left eye 611*a*, but not in the field-of-view of the left image sensor 621*a*. The view 702 further includes the left hand 799 of the user in front of the first surface 511 partially occluding the letter B.

In various implementations, the HMD 620 transforms the first image 701 to make it appear as though it was captured from the left eye perspective rather than the left image sensor perspective. In various implementations, the HMD 620 transforms the first image 701 based on the first image 701, depth values associated with first image 701, and a difference between the left image sensor perspective and the left eye perspective. In various implementations, depth values are obtained from various sources and have various resolutions and accuracies. In various implementations, the depth values are used to generate a depth map including a respective depth value for each pixel of the first image 701. In various implementations, the difference between the left image sensor perspective and the left eye perspective is determined during a calibration procedure. In various implementations, for each pixel location of the transformed image, a corresponding pixel location of the first image 701 is determined based on depth value associated with the pixel location.

In various implementations, the resulting transformed image includes holes, e.g., pixel locations of the transformed image for which there is no corresponding pixel location of the first image 701. Such holes may be filled via interpolation or using additional images, such as another image from a different perspective (e.g., from the right image sensor 621*b* or from the left image sensor 621*a* at a different time).

In various implementations, the resulting transformed image includes ambiguities, e.g., pixel locations of the transformed image for where there are multiple corresponding pixel locations of the first image 701. Such ambiguities may be disambiguated using averaging or consensus algorithms.

In various implementations, the depth map is smoothed to avoid the generation of warping artifacts, such as holes and ambiguities, in the transformed image. In various implementations, the depth map is clamped to avoid the generation of warping artifacts in the transformed image. For example, in various implementations, any depth in the depth map under a depth threshold (e.g., 70 cm) is set to be at the depth threshold.

Warping artifacts are more likely to be noticeable to a user when the corresponding pixel location of the first image 701 is more different from the pixel location of the transformed image. Various factors contribute to a large difference in the corresponding pixel location of the first image 701 and the pixel location of the transformed image. For example, the difference is larger when there is a larger difference between the left image sensor perspective and the left eye perspective. As another example, the difference is larger when the depth is smaller. For example, the left hand 799 of the user experiences greater parallax shift between FIGS. 7A and 7B than the structure 510.

Figure 8A:
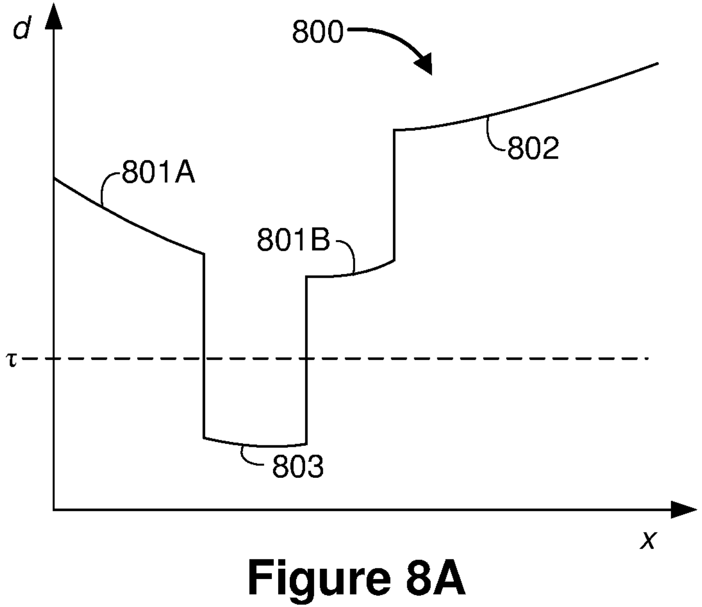
FIG. 8A illustrates a depth plot for a central row of a depth map of the first image of FIG. 7A.

FIG. 8A illustrates a depth plot 800 for a central row of a depth map of the first image 701. The depth plot 800 includes a left first portion 801A corresponding to the distance between the left scene camera 621A and various points on the first surface 511 of the structure 510 to the left of the left hand 799 of the user and a right first portion 801B corresponding to the distance between the left scene camera 621A and various points on the first surface 511 of the structure 510 to the right of the left hand 799 of the user. The depth plot 800 includes a second portion 802 corresponding to the distance between the left scene camera 621A and various points on the second surface 512 of the structure 510. The depth plot 800 includes a third portion 803 corresponding to the distance between the left scene camera 621A and various points on the left hand 799 of the user.

Because the depths of the third portion 803 is small, holes and/or ambiguities are likely to be noticed in this region. Accordingly, in various implementations, depths less than a depth threshold, $\tau$, are increased to the depth threshold. Thus, although the transforming in this region is imperfect, holes and/or ambiguities are less noticeable.

Figure 8B:
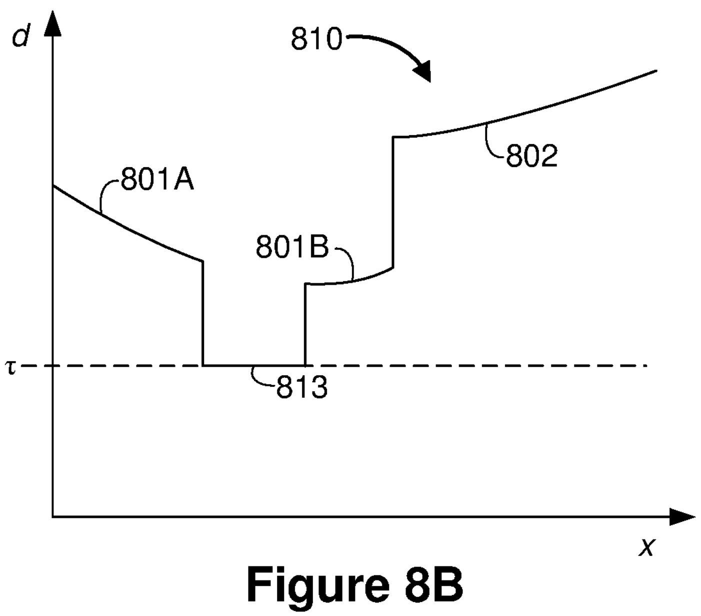
FIG. 8B illustrates a clamped depth plot for the central row of the depth map of the first image of FIG. 7A.

FIG. 8B illustrates a clamped depth plot 810 for a central row of a clamped depth map of the first image 701. The clamped depth plot 810 includes the left first portion 801A, the right first portion 801B, and the second portion 802. However, rather than including the third portion 803, the clamped depth plot 810 includes a clamped third portion 813 at the depth threshold.

Figure 9A:
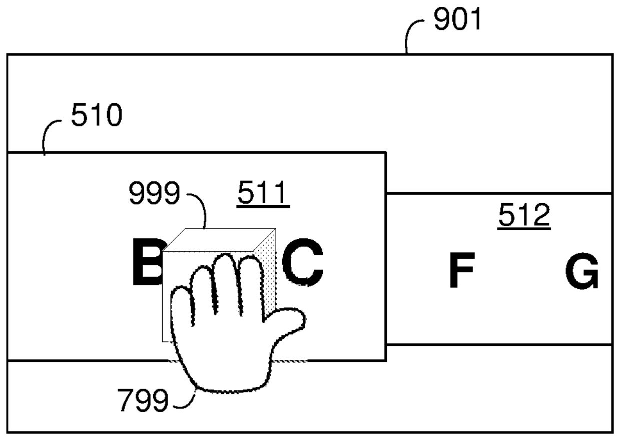
FIG. 9A illustrates a first composite image based on the first image of FIG. 7A.

FIG. 9A illustrates a first composite image 901. The first composite image 901 is a composite of the first image 701 of the physical environment 501 captured by the left image sensor 621*a* and a first image of content including a virtual object 999 in the left hand 799 of the user. In various implementations, the first image of content is generated based on the first image 701, e.g., by detecting the location of the left hand 799 of the user in the first image 701.

Figure 9B:
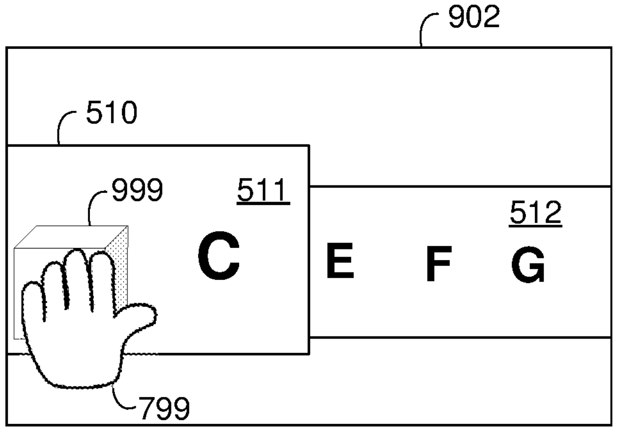
FIG. 9B illustrates a second composite image based on the first image of FIG. 7A.

FIG. 9B illustrates a second composite image 902. In various implementations, the second composite image 902 is a transformed version of the first composite image 901, including the first image of content including the virtual object 999. Thus, in various implementations, virtual content is generated and added to an image before the image is transformed. However, awaiting the generation of virtual content before transformation may increase latency. In various implementations, the composite image 902 is a composite of a transformed version of the first image 701 and a second image of content including the virtual object 999 generated based on the transformed version of the first image 701. Thus, in various implementations, virtual content is generated and added to an image after the image has been transformed. However, awaiting transformation before the generation of virtual content may also increase latency.

In various implementations, the second composite image 902 is a composite of a transformed version the first image 701 and third image of content including a transformed version of the virtual object 999. Thus, in various implementations, virtual content is generated before an image is transformed, but added after the image (and the virtual content) has been transformed. In various implementations, the third image of content is generated by transforming the first image of content including the virtual object 999, e.g., using a depth map for each pixel of the first image of content at which content is present.

However, in various implementations, generating the third image of content includes transforming the virtual content before it is flattened into the third image of content. For example, in various implementations, the virtual content is transformed based on a single depth.

In implementations in which virtual content is generated before an image is transformed, but added after the image has been transformed, the virtual content is similarly transformed. In various implementations, the virtual content is transformed based on a single depth. In various implementations, the single depth corresponds to a point of interaction with the content. For example, in various implementations, the depth corresponds to a location in which the left hand 799 of the user intersects with the virtual object 999. In various implementations, the single depth corresponds to a centroid (or center) of the content, e.g., the center-of-mass of a virtual object.

In various implementations, the image of the content is transformed based on multiple depths corresponding to vertices of the content, e.g., vertices of a virtual object, rather than the depth at each pixel location. Thus, in various implementations, the one or more depths of the content are multiple depths corresponding to vertices of the content.

Thus, while the first image 701 is being transformed, the virtual content is generated and efficiently transformed using one or a few depths. Thus, latency for displaying perspective transformed images with virtual content is reduced.

Figure 10:
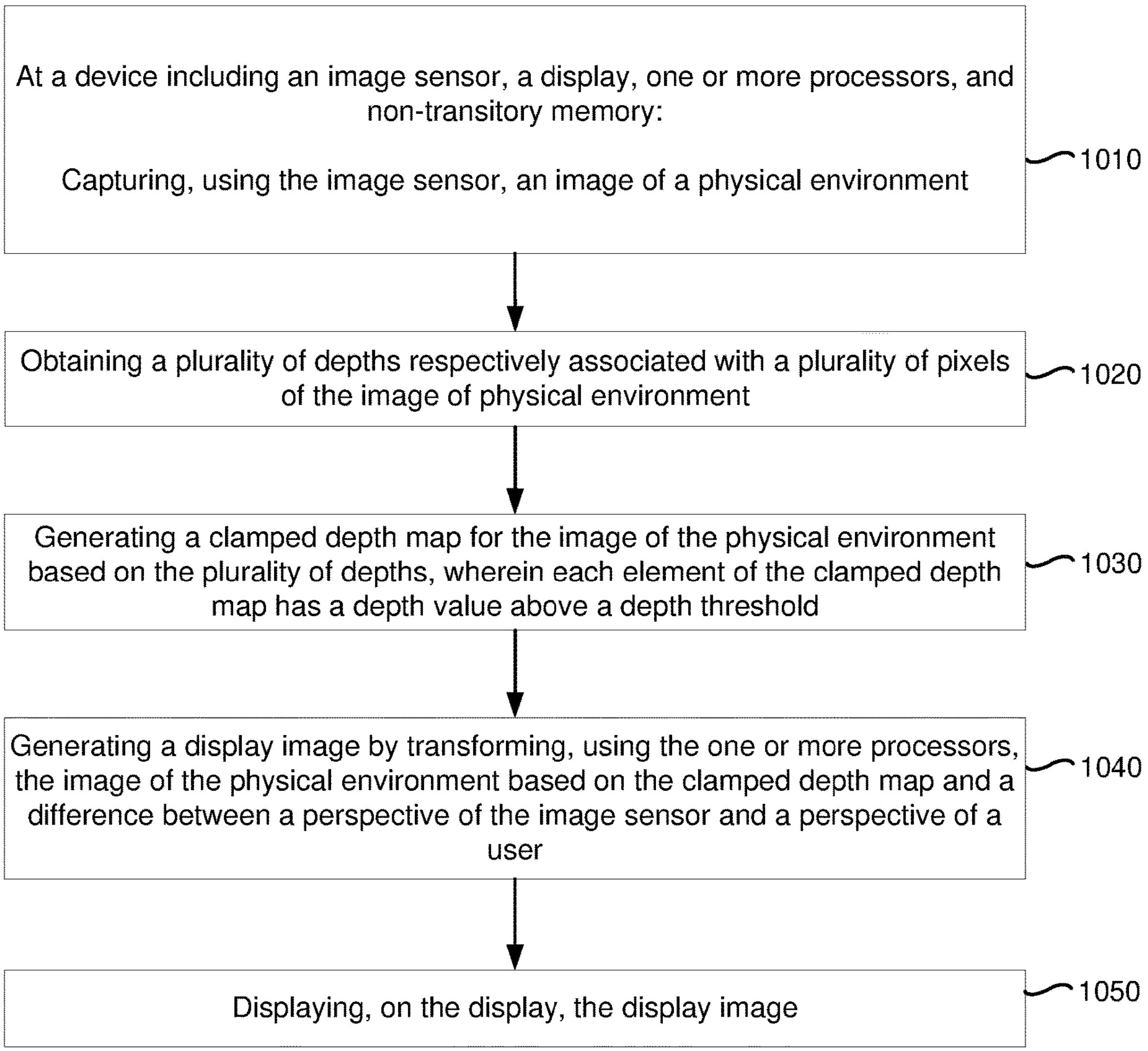
FIG. 10 is a flowchart representation of a method of performing a perspective transform of an image in accordance with some implementations.

FIG. 10 is a flowchart representation of a method of performing perspective correction of an image in accordance with some implementations. In various implementations, the method 1000 is performed by a device with one or more processors, non-transitory memory, an image sensor, and a display (e.g., the electronic device 120 of FIG. 3). In some implementations, the method 1000 is performed by processing logic, including hardware, firmware, software, or a combination thereof. In some implementations, the method 1000 is performed by a processor executing instructions (e.g., code) stored in a non-transitory computer-readable medium (e.g., a memory).

The method 1000 begins, in block 1010, with the device capturing, using the image sensor, an image of a physical environment.

The method 1000 continues, in block 1020, with the device obtaining a plurality of depths respectively associated with a plurality of pixels of the image of the physical environment. In various implementations, the plurality of depths represents, for respective pixels of the image, an estimated distance between the image sensor and an object in the physical environment represented by the pixel.

In various implementations, the device obtains the plurality of depths from a depth sensor. In various implementations, the device obtains the plurality of depths using stereo matching, e.g., using the image of the scene as captured by a left scene camera and another image of the scene captured by a right scene camera. In various implementations, the device obtains the plurality of depths through eye tracking, e.g., the intersection of the gaze directions of two eyes of user indicates the depth of an object the user is looking.

The method 1000 continues, in block 1030, with the device generating a clamped depth map for the image of the physical environment based on the plurality of depths. In various implementations, the clamped depth map is a dense depth map which represents, for each pixel of the image of the physical environment, an estimated distance between the image sensor and an object in the physical environment represented by the pixel. In various implementations, the clamped depth map includes a sparse depth map which represents, for each of a subset of the pixels of the image of the physical environment, an estimated distance between the image sensor and an object in the physical environment represented by the pixel.

In various implementations, each element of the clamped depth map has a depth value above or equal to a depth threshold. In various implementations, generating the clamped depth map includes generating an unclamped depth map of the image of the physical environment, wherein a set of one or more elements of the unclamped depth map each have a depth value less than the depth threshold and changing the depth value of the set of one or more elements to the depth threshold.

In various implementations, the depth threshold is static, e.g., the same between images of the physical environment. In various implementations, the depth threshold is dynamic. In various implementations, the depth threshold is based on movement of the device. For example, if the device is moving, the depth threshold may be reduced as compared to a situation in which the device is not moving. In various implementations, the depth threshold is based on objects in the physical environment. For example, in various implementations, if the physical environment includes a computer screen, the depth threshold may be set further away than the computer screen.

In various implementations, the clamped depth map is a smooth depth map in which a difference between depth values of any two adjacent elements of the clamped depth map is below a smoothness threshold. In various implementations, the difference between depth values of any two adjacent elements of the clamped depth map is less than an amount that would generate a hole in a transformed image.

In various implementations, the device generates the smooth depth map by interpolating between the plurality of depths, e.g., interpolating between pixels of a sparse depth map. In various implementations, the device generates the smooth depth map by filtering the plurality of depths, e.g., filtering a dense depth map. In various implementations, the dense depth map is filtered by convolving the depth map with a Gaussian smoothing kernel. Where the differences between nearby elements of the plurality of depths is small, less filtering (or no filtering) may be needed to maintain a difference between any two adjacent elements of the depth map below the smoothness threshold, whereas where the differences between nearby elements of the plurality of depths is large, more filtering may be needed to maintain a difference between any two adjacent elements of the depth map below the smoothness threshold. Accordingly, in various implementations, a strength of the filtering at a location is based on a difference between two of the plurality of depths at the location.

In various implementations, the smooth depth map is generated such that elements of the smooth depth map are as close as possible to the plurality of depths subject to the constraint that the difference between any two adjacent elements of the smooth depth map is below the smoothness threshold. In various implementations, the smooth depth map is generated such that the difference between any two adjacent elements of the smooth depth map is far below the smoothness threshold, e.g., the smooth depth map is much smoother than necessary to simply eliminate holes.

In various implementations, the smoothness threshold is constant across the entire smooth depth map. In various implementations, the smoothness threshold is dependent on pixel location in the depth map. For example, in various implementations, the smoothness threshold at the center of the image is greater than the smoothness threshold at the edges of the image.

The method 1000 continues, in block 1040 with the device generating a display image by transforming, using the one or more processors, the image of the physical environment based on the clamped depth map and a difference between a perspective of the image sensor and a perspective of a user. In various implementations, the device transforms the image of the physical environment at an image pixel level, an image tile level, or a combination thereof. In various implementations, the device has an eye location and the perspective of the user is from the eye location. The eye location is, for example, where an eye of the user is positioned when the device is head-mounted. For example, in various implementations, the eye location is a fixed distance perpendicularly away from the display. Thus, in various implementations, the perspective of the user is from a location behind the display and the perspective of the image sensor is from a location in front of the display.

In various implementations, the device performs a projective transformation based on the depth map and the difference between the perspective of the image sensor and the perspective of the user.

In various implementations, the projective transformation is a forward mapping in which, for each pixel of the image of the physical environment at a pixel location in an untransformed space, a new pixel location is determined in a transformed space of the transformed image. In various implementations, the projective transformation is a backwards mapping in which, for each pixel of the transformed image at a pixel location in a transformed space, a source pixel location is determined in an untransformed space of the image of the physical environment.

In various implementations, the source pixel location is determined according to the following equation in which $x_{cam}$ and $y_{cam}$ are the pixel location in the untransformed space, $x_{eye}$ and $y_{eye}$ are the pixel location in the transformed space, $P_{eye}$ is a 4×4 view projection matrix of the user representing the perspective of the user, $P_{cam}$ is a 4×4 view projection matrix of the image sensor representing the perspective of the image sensor, and $d_{xy}$ is the depth map value at the pixel location:

$$\begin{bmatrix} x_{cam} \\ y_{cam} \\ 1 \end{bmatrix} \leftarrow P_{cam} \cdot P_{eye}^{-1} \cdot \begin{bmatrix} x_{eye} \\ y_{eye} \\ 1 \\ \left(\frac{1}{d_{xy}}\right) \end{bmatrix}.$$

In various implementations, the source pixel location is determined using the above equation for each pixel in the image of the physical environment. In various implementations, the source pixel location is determined using the above equation for less than each pixel of the image of the physical environment.

In various implementations, the device determines the view projection matrix of the user and the view projection matrix of the image sensor during a calibration and stores data indicative of the view projection matrices (or their product) in a non-transitory memory. The product of the view projection matrices is a transformation matrix that represents a difference between the perspective of the image sensor and the perspective of the user.

Thus, in various implementations, transforming the image of the physical environment includes determining, for a plurality of pixels of the transformed image having respective pixel locations, a respective plurality of source pixel locations. In various implementations, determining the respective plurality of source pixel locations includes, for each of the plurality of pixels of the transformed image, multiplying a vector including the respective pixel location and the multiplicative inverse of the respective element of the depth map by a transformation matrix representing the difference between the perspective of the image sensor and the perspective of the user.

Using the source pixel locations in the untransformed space and the pixel values of the pixels of the image of the physical environment, the device generates pixel values for each pixel location of the transformed image using interpolation or other techniques.

In various implementations, the resulting transformed image includes holes. Such holes may be filled via interpolation or using additional images, such as another image from a different perspective (e.g., a second image sensor or the same image sensor at a different time).

The method 1000 continues, in block 1050, with the device displaying, on the display, the display image. In various implementations, the display image includes XR content. In some implementations, XR content is added to the image of the physical environment before the transformation (at block 1040). In some implementations, XR content is added to the transformed image of the physical environment. In various implementations, the device determines whether to add the XR content to the image of the physical environment before or after the transformation based on metadata indicative of the XR content's attachment to the physical environment. In various implementations, the device determines whether to add the XR content to the image of the physical environment before or after the transformation based on an amount of XR content (e.g., a percentage of the image of the physical environment containing XR content). In various implementations, the device determines whether to add the XR content to the image of the physical environment before or after the transformation based on metadata indicative of a depth of the XR content.

In various implementations, the method 1000 includes generating an image of content. The method 1000 includes obtaining one or more depths of the content. Further, in various implementations, generating the display image includes transforming, using the one or more processors, the image of the content based on the one or more depths of the content and the difference between the perspective of the image sensor and the perspective of the user. The method 1000 includes compositing the transformed image of the content with the transformed image of the physical environment. Thus, in various implementations, the image of the physical environment and the image of the content are separately transformed and composited together.

In various implementations, the image of the content is transformed based on a single depth rather than a depth at each pixel location. Thus, in various implementations, the one or more depths of the content are a single depth. In various implementations, the single depth corresponds to a point of interaction with the content. For example, in various implementations, the depth corresponds to a location in which a user's hand intersects with a virtual object. In various implementations, the single depth corresponds to a centroid (or center) of the content, e.g., the center-of-mass of a virtual object.

In various implementations, the image of the content is transformed based on multiple depths corresponding to vertices of the content, e.g., vertices of a virtual object, rather than the depth at each pixel location. Thus, in various implementations, the one or more depths of the content are multiple depths corresponding to vertices of the content.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including one or more processors, non-transitory memory, an image sensor, and a display:

capturing, using the image sensor, an image of a physical environment;

obtaining a plurality of depths respectively associated with a plurality of pixels of the image of the physical environment;

generating a clamped depth map of the image of the physical environment based on the plurality of depths, wherein each element of the clamped depth map has a depth value above or equal to a depth threshold, including generating an unclamped depth map of the image of the physical environment, wherein a set of one or more elements of the unclamped depth map each have a depth value less than the depth threshold, and changing the depth value of the set of one or more elements to the depth threshold;

generating a display image by transforming, using the one or more processors, the image of the physical environment based on the clamped depth map and a difference between a perspective of the image sensor and a perspective of a user; and displaying, on the display, the display image.

2. The method of claim 1, wherein the depth threshold is based on movement of the device.

3. The method of claim 1, wherein the depth threshold is based on objects in the physical environment.

4. The method of claim 1, wherein a difference between depth values of any two adjacent elements of the clamped depth map is below a smoothness threshold.

5. The method of claim 1, wherein the device includes an eye location and the perspective of the user is from the eye location.

6. The method of claim 1, wherein the perspective of the user is from a location behind the display and the perspective of the image sensor is from a location in front of the display.

7. The method of claim 1, further comprising:

generating an image of content; and obtaining one or more depths of the content, wherein generating the display image includes:

transforming, using the one or more processors, the image of the content based on the one or more depths of the content and the difference between the perspective of the image sensor and the perspective of a user; and compositing the transformed image of the content with the transformed image of the physical environment.

8. The method of claim 7, wherein the one or more depths of the content are a single depth.

9. The method of claim 8, wherein the single depth corresponds to a point of interaction with the content.

10. The method of claim 8, wherein the single depth corresponds to a centroid of the content.

11. The method of claim 7, wherein the one or more depths of the content are multiple depths corresponding to vertices of the content.

12. A device comprising:

an image sensor;

a display;

a non-transitory memory; and one or more processors to:

capture, using the image sensor, an image of a physical environment;

obtain a plurality of depths respectively associated with a plurality of pixels of the image of the physical environment;

generate a clamped depth map of the image of the physical environment based on the plurality of depths, wherein each element of the clamped depth map has a depth value below a depth threshold, including generating an unclamped depth map of the image of the physical environment, wherein a set of one or more elements of the unclamped depth map each have a depth value less than the depth threshold, and changing the depth value of the set of one or more elements to the depth threshold;

generate a display image by transforming, using the one or more processors, the image of the physical environment based on the clamped depth map and a difference between a perspective of the image sensor and a perspective from an eye location; and display, on the display, the display image.

13. The device of claim 12, wherein the depth threshold is based on movement of the device.

14. The device of claim 12, wherein the depth threshold is based on objects in the physical environment.

15. The device of claim 12, wherein the one or more processors are further to:

generate an image of content; and obtain one or more depths of the content, wherein the one or more processors are to generate the display image by:

transforming, using the one or more processors, the image of the content based on the one or more depths of the content and the difference between the perspective of the image sensor and the perspective of a user; and compositing the transformed image of the content with the transformed image of the physical environment.

16. The device of claim 15, wherein the one or more depths of the content are a single depth.

17. The device of claim 16, wherein the single depth corresponds to a point of interaction with the content.

18. A non-transitory memory storing one or more programs, which, when executed by one or more processors of a device with an image sensor and a display, cause the device to:

capture, using the image sensor, an image of a physical environment;

obtain a plurality of depths respectively associated with a plurality of pixels of the image of the physical environment;

generate a clamped depth map of the image of the physical environment based on the plurality of depths, wherein each element of the clamped depth map has a depth value below a depth threshold, including generating an unclamped depth map of the image of the physical environment, wherein a set of one or more elements of the unclamped depth map each have a depth value less than the depth threshold, and changing the depth value of the set of one or more elements to the depth threshold;

generate a display image by transforming, using the one or more processors, the image of the physical environment based on the clamped depth map and a difference between a perspective of the image sensor and a perspective from an eye location; and display, on the display, the display image.

* * * * *